United States Patent
Chen et al.

(10) Patent No.: US 7,098,632 B2
(45) Date of Patent: Aug. 29, 2006

(54) CONTROLLER IN A VOLTAGE MODE BUCK CONVERTER FOR IMPLEMENTING A MODE-SWITCH FUNCTION AND AN OVER-CURRENT PROTECTION BY A MULTIFUNCTION PIN AND METHOD THEREOF

(75) Inventors: Ming-Hsueh Chen, Banchiau (TW); Ming Chu Chien, Dali (TW)

(73) Assignee: Analog and Power Electronics Corp., Hsinchu (TW)

( * ) Notice: Subject to any disclaimer, the term of this patent is extended or adjusted under 35 U.S.C. 154(b) by 0 days.

(21) Appl. No.: 11/098,492

(22) Filed: Apr. 5, 2005

(65) Prior Publication Data
US 2005/0258808 A1 Nov. 24, 2005

(30) Foreign Application Priority Data
May 24, 2004 (TW) ................ 93114674 A

(51) Int. Cl.
*G05F 1/652* (2006.01)
(52) U.S. Cl. ............... 323/222; 323/282; 323/285

(58) Field of Classification Search ............... 323/222, 323/282, 285
See application file for complete search history.

(56) References Cited

U.S. PATENT DOCUMENTS

| 5,912,549 A * | 6/1999 | Farrington et al. ......... 323/207 |
| 6,388,429 B1 * | 5/2002 | Mao .......................... 323/222 |
| 6,781,352 B1 * | 8/2004 | Athari et al. ............... 323/222 |
| 6,965,502 B1 * | 11/2005 | Duffy et al. ................. 361/18 |

* cited by examiner

*Primary Examiner*—Bao Q. Vu
(74) *Attorney, Agent, or Firm*—Rosenberg, Klein & Lee

(57) ABSTRACT

In a voltage mode buck converter having a pair of switches connected in series by a phase node to be switched by a pair of drive signals generated from a first control signal, a phase resistor is connected between a multifunction pin and the phase node, and a controller generates a second control signal and a third control signal from the second drive signal to sense the voltage on the multifunction pin respectively to generate an over-current signal and a CCM mode switch signal to switch the converter between a CCM mode and a DCM mode.

12 Claims, 5 Drawing Sheets

CONTROLLER IN A VOLTAGE MODE BUCK CONVERTER FOR IMPLEMENTING A MODE-SWITCH FUNCTION AND AN OVER-CURRENT PROTECTION BY A MULTIFUNCTION PIN AND METHOD THEREOF

FIELD OF THE INVENTION

The present invention is related generally to a voltage converter, and more particularly, to a controller in a voltage mode buck converter for implementing a mode switch function and an over-current protection by a multifunction pin.

BACKGROUND OF THE INVENTION

A voltage mode buck converter is used to regulate the level of a direct current (DC) voltage and maintain the regulated voltage stably at a desired level, by switching a high side switch and a low side switch to generate voltage pulses through a low-pass filter including inductor and capacitor to generate a DC output voltage. An assortment of appliances has been specified in their consumed powers under stand-by modes in an energy saving (Green Power) program driven by some advanced countries. By analyzing the power consumptions specified in stand-by modes, it was clearly found that the switching loss of the power elements such as power MOSFET in a voltage mode buck converter takes the most percentage of the total power consumption. To reduce this power loss, it has been proposed an operational mode not at constant switching frequency, but depending on the loading when it is operated under a light load such as stand-by mode, which is referred to as discontinuous current mode (DCM). For example, in U.S. Pat. No. 5,568,044 issued to Bittner et al., a voltage regulator is proposed to operate in either pulse width modulation (PWM) or pulse frequency modulation (PFM) mode, by using a PFM control circuit to switch the voltage regulator to PFM mode in which the switching frequency of the high side switch varies whenever the output current is lower than a threshold.

In addition, a voltage mode buck converter is often operated under a heavy load in typical applications, and it is therefore required an over-current protection. Particularly, for those applications of power conversion from high voltage to low voltage and high speed switching, sensing the current flowing through the high side switch by conventional methods has been hard to precisely detect the over current. For example, for an input voltage of 12V, a desired output voltage of 1.2V, and a switching frequency of 500 kHz, the duty cycle will be 0.1, and the corresponding conductive period of the high side MOS will be as short as 200 ns. Owing to such short conductive period, the noise caused by inductor, capacitor and load variation would bring the over-current protection with abnormal detection.

Further, conventionally, the switching frequency of the high side and low side switches is regulated by sensing the output current of the converter, and the over-current protection is accomplished by sensing the current flowing through the high side switch. As a result, to simultaneously implementing the over-current protection and a function of switching the converter between continuous current mode (CCM) and DCM mode, at least two pins are required for a controller chip in the converter to sense the output current and high side current respectively. If the over-current protection and the mode switch function could be simultaneously accomplished by only one single pin, the controller chip will be further shrunken, and the cost will be reduced accordingly.

SUMMARY OF THE INVENTION

It is therefore an object of the present invention to provide a controller in a voltage mode buck converter for implementing a mode switch function and an over-current protection by a multifunction pin and method thereof.

In a voltage mode buck converter having a high side switch and a low side switch connected in series by a phase node to be switched by a first drive signal and a second drive signal generated by a controller to generate an output voltage, according to the present invention, to implement a mode switch function and an over-current protection by a multifunction pin, the controller comprises a driver responsive to a first control signal for generating the first and second drive signals, a CCM/DCM control circuit for generating the first control signal, a multiplexer for generating a second control signal and a third control signal from the second drive signal, an over-current sense circuit controlled by the second control signal for sensing a voltage on the multifunction pin to thereby generate an over-current signal for signaling the CCM/DCM control circuit, and a CCM/DCM sense circuit controlled by the third control signal for sensing the voltage on the multifunction pin and the output voltage to thereby generate a CCM mode switch signal for the CCM/DCM control circuit to switch the converter between a CCM mode and a DCM mode, wherein the multifunction pin and phase node has a phase resistor connected therebetween for generating a voltage drop between the multifunction pin and phase node when a current flowing therethrough. Preferably, the driver is also supplied with a power input voltage and a boot voltage for booting the high side switch up, and the boot voltage is converted from the power input voltage by an internal voltage regulator of the controller. Preferably, for the converter to be assured with the over-current protection and the CCM/DCM mode switch function, a maximum duty clamp circuit is also comprised in the controller to limit the duty of the high side switch, so as for the low side switch to be forced to turn on.

Since the controller accomplishes the mode switch function and the over-current protection by a single pin, the number of the pins required for the controller is reduced.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
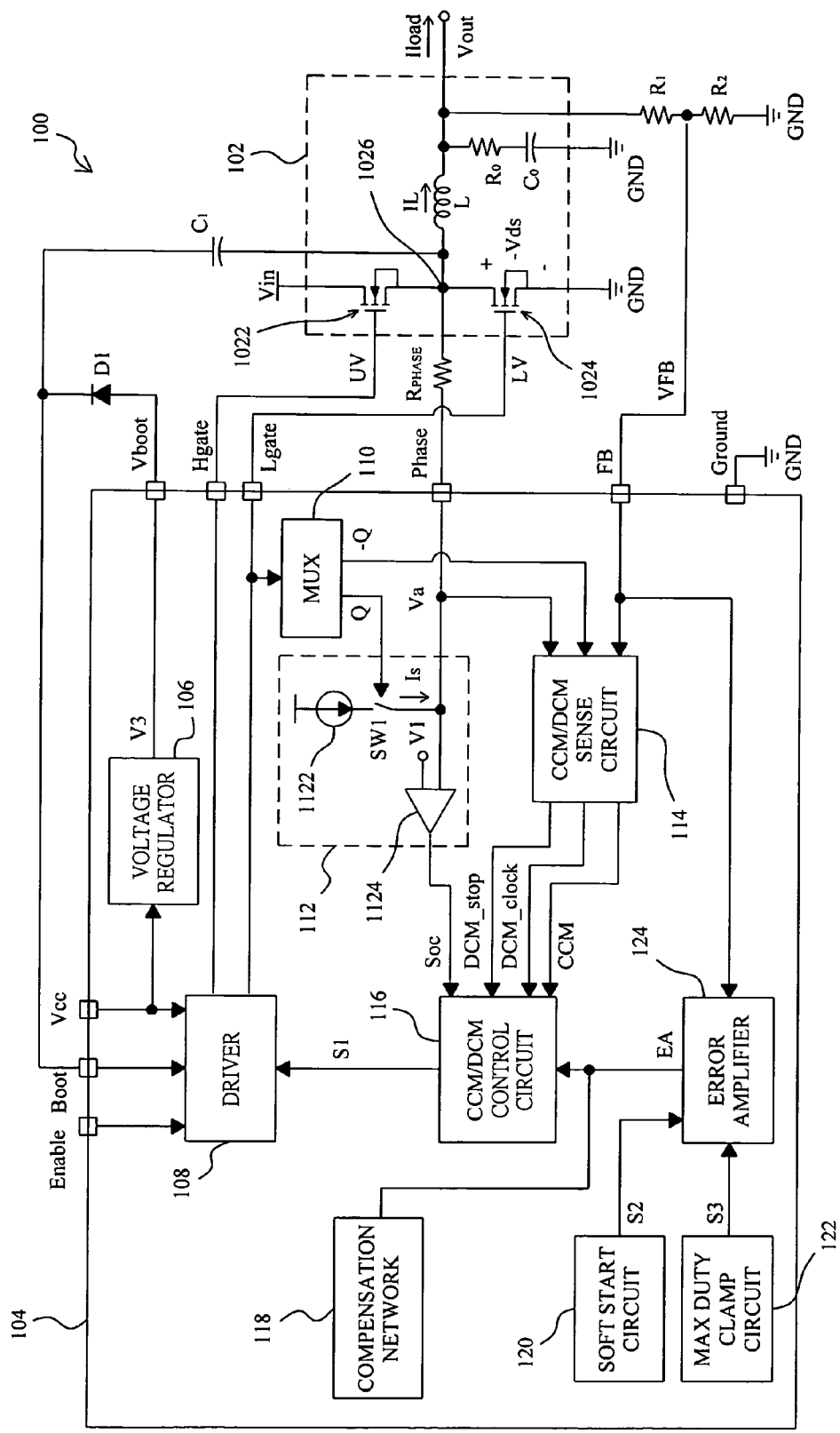
FIG. 1 shows a voltage mode buck converter having a controller of the present invention.

FIG. 1 shows a voltage mode buck converter 100, which comprises an output stage 102 operated by a PWM controller 104 of the present invention. The output stage 102 has a high side MOS transistor 1022 connected between an input voltage Vin and a phase node 1026, and a low side MOS transistor 1024 connected between the phase node 1026 and ground GND. The high side and low side MOS transistors 1022 and 1024 are switched by drive signals UV and LV respectively, to generate an output voltage Vout and a load current Iload. A voltage divider composed of resistors R1 and R2 is connected between the output voltage Vout and ground GND to generate a feedback voltage VFB supplied to a feedback pin FB of the controller 104.

Figure 2:
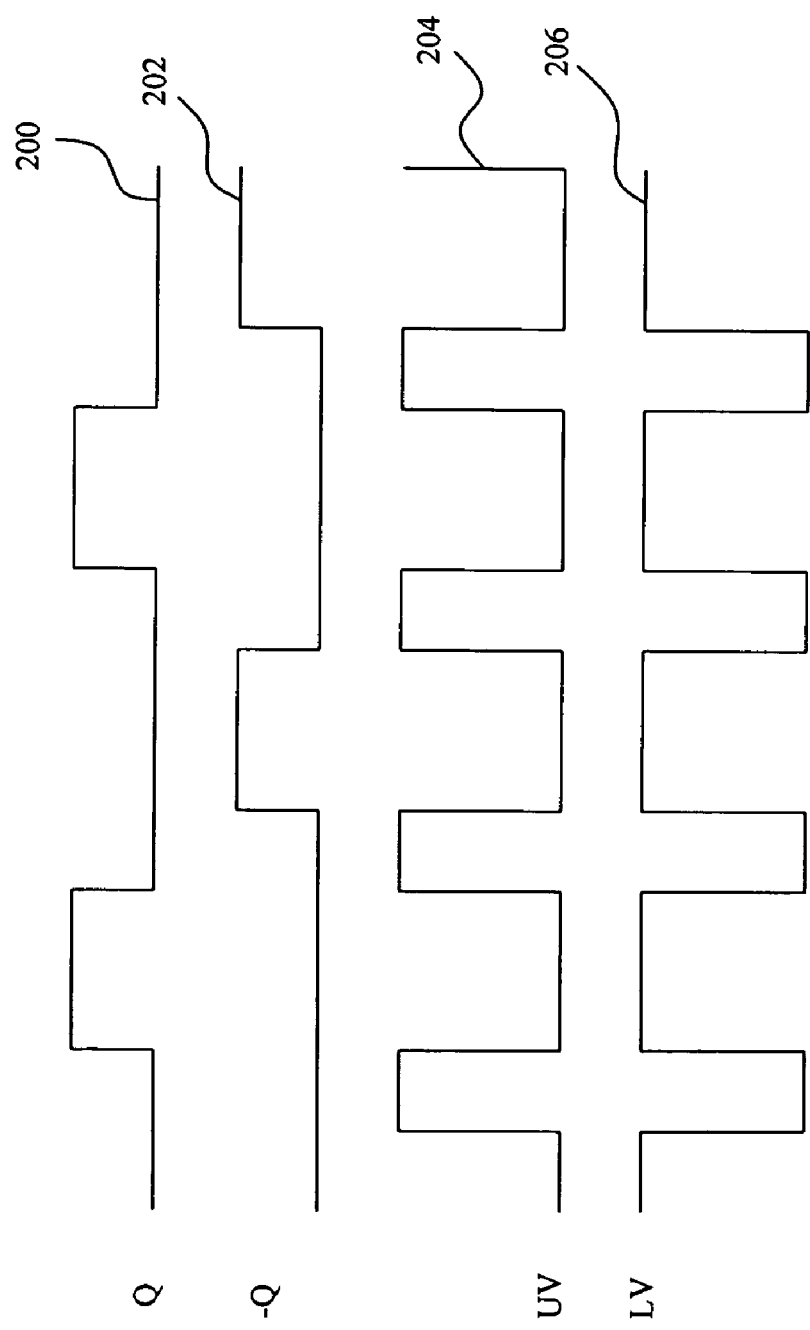
FIG. 2 shows a timing diagram of the control signals Q and −Q and the drive signals UV and LV of the converter shown in FIG. 1.

In the controller 104, a multiplexer 110 is also connected with the drive signal LV for the low side MOS transistor 1024, to divide the duties of the drive signal LV to thereby generate control signals Q and −Q for an over-current sense circuit 112 and a CCM/DCM sense circuit 114 respectively. For more illustrative, FIG. 2 shows a timing diagram of the control signals Q and −Q and the drive signals UV and LV, in which waveforms 200 and 202 represent the control signals Q and −Q respectively, and waveforms 204 and 206 represent the drive signals UV and LV respectively. Specifically, the first on-duty of the drive signal LV is provided for the control signal Q, so as for the over-current sense circuit 112 for the over-current sensing, the second on-duty of the drive signal LV is provided for the control signal −Q, so as for the CCM/DCM sense circuit 114 for the mode sensing, the third on-duty of the drive signal LV is provided for the control signal Q to control the over-current sense circuit 112 again, the fourth on-duty of the drive signal LV is provided for the control signal −Q to control the CCM/DCM sense circuit 114 again, and the same way is repeated so as to generate the control signals Q and −Q by dividing the duties of the drive signal LV to control the over-current sense circuit 112 and CCM/DCM sense circuit 114 respectively.

The over-current sense circuit 112 is operated to determine if the load current Iload is too large, and it comprises a current source 1122 to supply a current Is, a switch SW1 switched by the control signal Q to conduct the current Is to a multifunction pin Phase, and a comparator 1124 to compare the voltage Va on the multifunction pin Phase with a reference voltage V1. When the low side MOS transistor 1024 turns on, and the control signal Q is at high level, the switch SW1 turns on to have the current Is flows through the multifunction pin Phase and thereby through a phase resistor Rphase connected between the multifunction pin Phase and the phase node 1026. As a result, the multifunction pin Phase has the voltage $$Va = Iload \times Rds + Is \times Rphase = -Vds + Is \times Rphase, \quad [EQ\text{-}1]$$

where Rds is the conductive resistance of the low side MOS transistor 1024, and Vds is the voltage difference between a source and a drain of the low side MOS transistor 1024. The comparator 1124 compares the voltage Va on the multifunction pin Phase and the reference voltage V1. When $$Va > V1, \quad [EQ\text{-}2]$$

the converter 100 is determined operating normally, and when $$Va < V1, \quad [EQ\text{-}3]$$

it is determined an over-current occurred in the converter 100. Once an over-current is sensed, the over-current signal Soc generated by the comparator 1124 will turn off the high side and low side MOS transistors 1022 and 1024 by signaling a CCM/DCM control circuit 116 that is the one for generating a control signal S1 for the driver 108 to determine the drive signals UV and LV. From the equations EQ-1 and EQ-3, it is obtained $$Iload < \frac{V1 - Is \times Rphase}{Rds}, \quad [Eq\text{-}4]$$

which shows that, if the conductive resistance Rds of the low side MOS transistor 1024 and the current Is provided by the current source 1122 are determined in advance, then the maximum of the load current Iload for normal operations, i.e., the threshold representative of an over-current event, is determined by the phase resistor Rphase. In other words, the threshold for over-current judgment may be set up by adjusting the resistance of the phase resistor Rphase, and therefore, once the parameters are determined, an over-current event may be sensed by sensing the voltage Va on the multifunction pin Phase.

Figure 3:
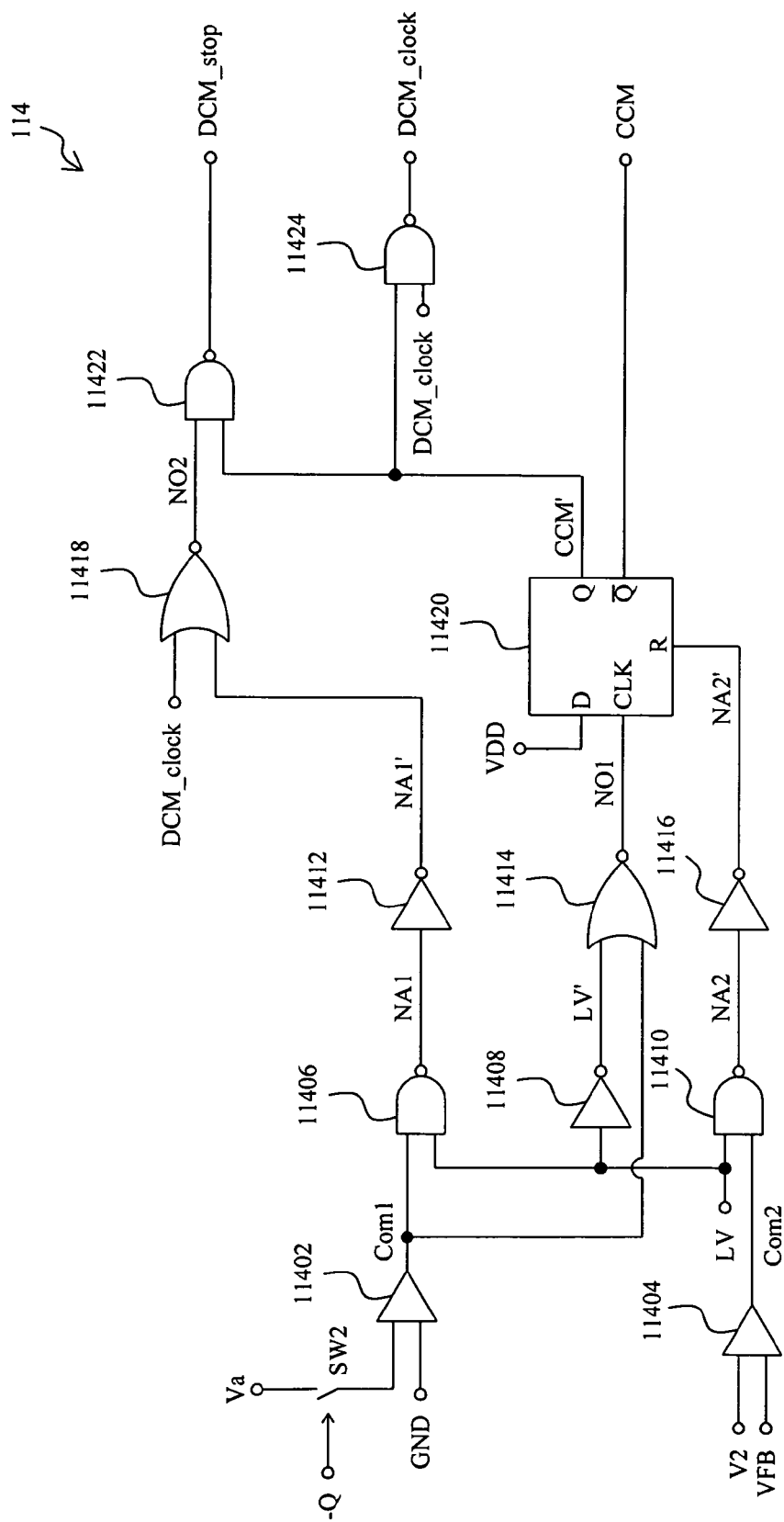
FIG. 3 shows an embodiment of the CCM/DCM sense circuit for the converter shown in FIG. 1.

Upon the control signal −Q, voltage Va and feedback voltage VFB, the CCM/DCM sense circuit 114 generates the DCM stop signal DCM_stop, DCM clock signal DCM_clock, and CCM mode switch signal CCM for the CCM/DCM control circuit 116 to signal the driver 108 to operate the high side and low side MOS transistors 1022 and 1024. FIG. 3 shows an embodiment of the CCM/DCM sense circuit 114, in which a switch SW2 is connected between the voltage Va and a comparator 11402 and controlled by the control signal −Q. When the low side MOS transistor 1024 turns on, and the control signal −Q is at high level, the switch SW2 turns on to have the comparator 11402 to compare the voltage Va with ground potential to generate a comparison signal Com1. A NAND gate 11406 receives the comparison signal Com1 and the drive signal LV to generate a signal NA1, which is inverted by an inverter 11412 to generate a signal NA1' connected to a NOR gate 11418. On the other hand, an inverter 11408 inverts the drive signal LV to generate a signal LV', and a NOR gate 11414 receives the signal LV' and the comparison signal Com1 to generate a signal NO1 coupled to the clock input of a flip-flop 11420. In addition, a comparator 11404 compares the feedback voltage VFB with a reference voltage V2 to generate a comparison signal Com2, and a NAND gate 11410 generates a signal NA2 in response to the comparison signal Com2 and the drive voltage LV. The signal NA2 is inverted by an inverter 11416 to generate a signal NA2' coupled to the reset input of the flip-flop 11420. The flip-flop 11420 generates the CCM mode switch signal CCM and its complementary signal CCM' in response to the signals NO 1 and NA2'. The CCM mode switch signal CCM is provided to the CCM/DCM control circuit 116. A NAND gate 11424 is controlled by the signal CCM' for generating the DCM clock signal DCM_clock to provide for the CCM/DCM control circuit 116. The DCM clock signal DCM_clock is also fed back to the NOR gate 11418 and NAND gate 11424. The NOR gate 11418 generates a signal NO2 in response to the signals DCM_clock and NA1', and a NAND gate 11422 generates the DCM stop signal DCM_stop in response to the signals NO2 and CCM' to provide for the CCM/DCM control circuit 116.

Referring to FIG. 1, based on the feedback voltage VFB, an error amplifier 124 generates an error signal EA for the CCM/DCM control circuit 116 to determine the control signal S1. As in a typical converter, the error signal EA is compensated by an internal compensation network 118. Furthermore, an internal soft start circuit 120 generates a signal S2 provided to the error amplifier 124 when the converter 100 powers on or resets. In addition, a maximum duty clamp circuit 122 generates a signal S3 provided to the error amplifier 124 to limit the maximum duty of the high side MOS transistor 1022, and thus the low side MOS transistor 1024 could be forced to turn on, so that the converter 100 is assured with the over-current protection and the CCM/DCM mode switch function. However, the compensation network 118, soft start circuit 120 and maximum duty clamp circuit 122 are conventional arts.

The CCM/DCM control circuit 116 receives the signals Soc, DCM_stop, DCM_clock, CCM and EA, and generates the control signal S1 for the driver 108. The driver 108 is also provided with an enable signal, a boot voltage and a power input voltage by pins Enable, Boot and Vcc respectively. The boot voltage is used to boot up the high side MOS transistor 1022 when the converter 100 powers on or resets, and is converted by an internal voltage regulator 106 from the power input voltage Vcc provided by the pin Vcc to a voltage V3 supplied through a pin Vboot and a diode D1. The drive signals UV and LV generated by the driver 108 are determined upon the control signal S1, and connected to the gates of the high side and low side MOS transistors 1022 and 1024 by pins Hgate and Lgate respectively.

Figure 4:
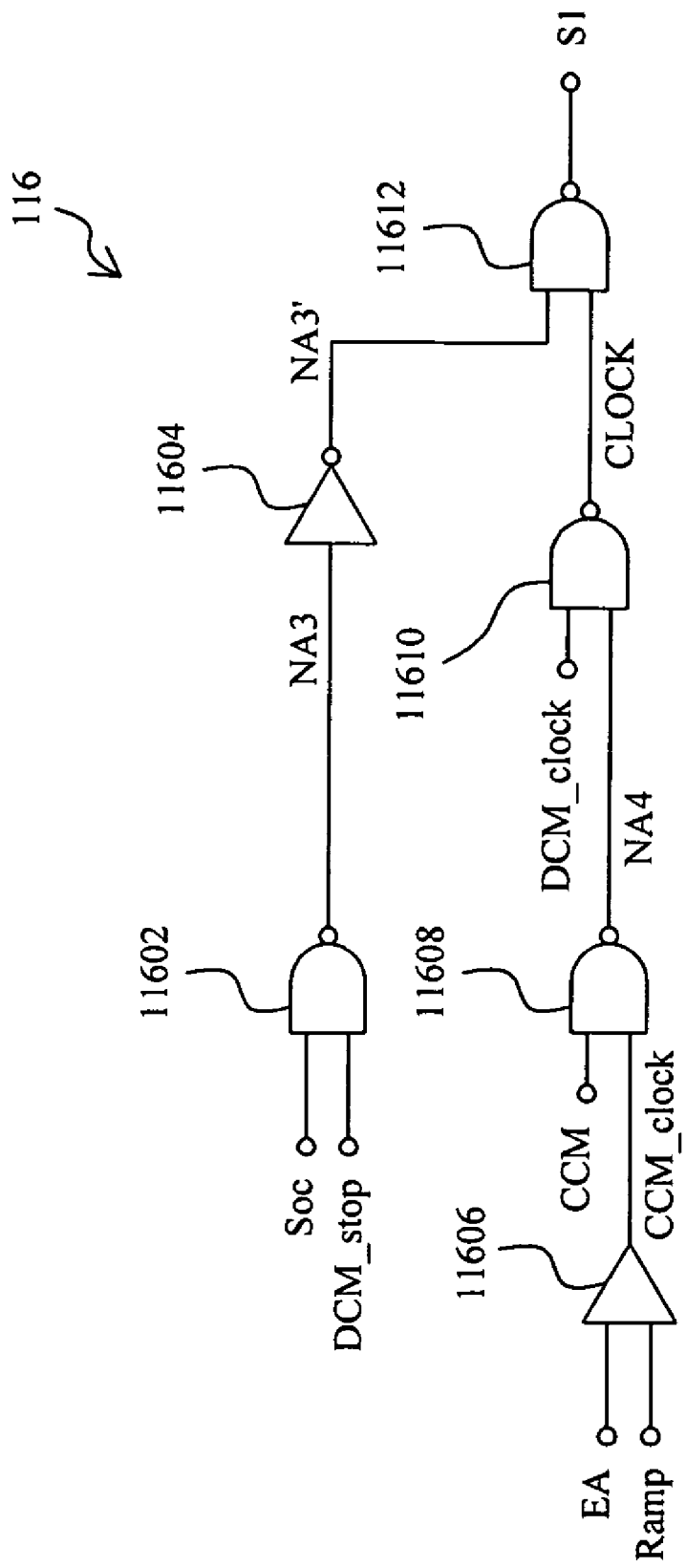
FIG. 4 shows an embodiment of the CCM/DCM control circuit for the converter shown in FIG. 1.

FIG. 4 shows an embodiment of the CCM/DCM control circuit 116, in which a NAND gate 11602 receives the over-current signal Soc and the DCM stop signal DCM_stop, and generates a signal NA3 that is inverted by an inverter 11604 to generate a signal NA3', a comparator 11606 compares the error signal EA with a ramp signal Ramp to generate a CCM clock signal CCM_clock, a NAND gate 11608 receives the CCM mode switch signal CCM and the CCM clock signal CCM_clock to generate a signal NA4, a NAND gate 11610 receives the DCM clock signal DCM_clock and the signal NA4 to generate a signal CLOCK, and a NAND gate 11612 generates the control signal S1 in response to the signals NA3' and CLOCK.

Figure 5:
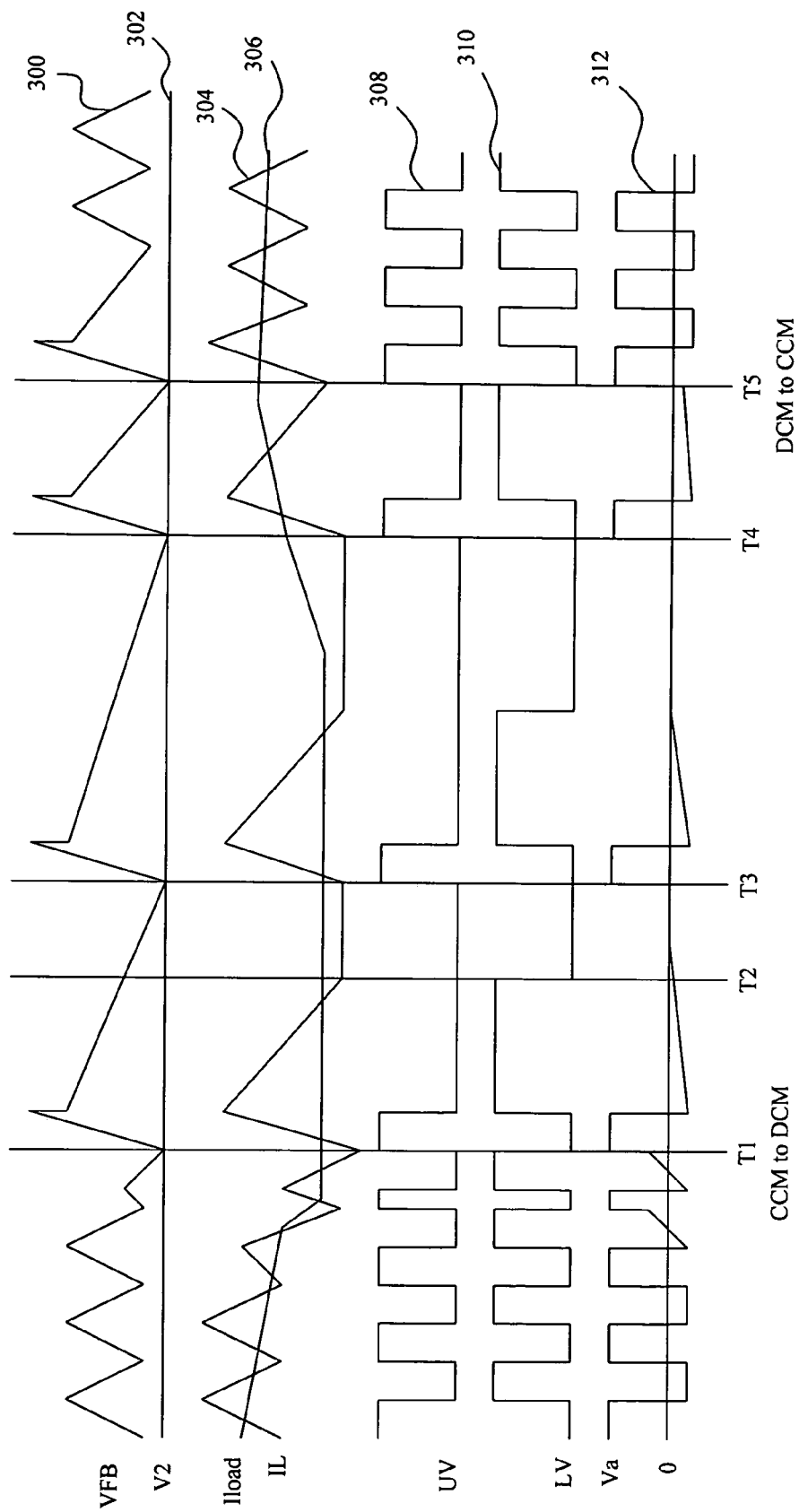
FIG. 5 shows a timing diagram of the feedback voltage VFB, reference voltage V2 in the CCM/DCM sense circuit shown in FIG. 3, voltage Va on the multifunction pin, inductor current IL, load current Iload, and drive signals UV and LV of the converter shown in FIG. 1.

FIG. 5 shows a timing diagram of the feedback voltage VFB, reference voltage V2 in the CCM/DCM sense circuit 114, voltage Va on the multifunction pin Phase, inductor current IL, load current Iload, and drive signals UV and LV, in which waveform 300 represents the feedback voltage VFB, waveform 302 represents the reference voltage V2, waveform 304 represents the inductor current IL, waveform 306 represents the load current Iload, waveform 308 represents the drive signal UV, waveform 310 represents the drive signal LV, and waveform 312 represents the voltage Va. Referring to FIG. 1 and FIG. 5, after the load changes from heavy to light, as shown at time T1, and the drive signal LV turns on the low side MOS transistor 1024, the voltage Va begins to increase, and the feedback voltage VFB decreases. When the voltage Va is greater than zero, and the feedback voltage VFB is lower than the reference voltage V2, the DCM clock signal DCM_clock provided by the CCM/DCM sense circuit 114 is at high level, and the CCM mode switch signal CCM is at low level, thereby the CCM/DCM control circuit 116 switching the converter 100 to the DCM mode and operating under the DCM clock signal DCM_clock. In this case, the duty of the drive signal UV is fixed, and the duty of the drive signal LV is determined by the DCM clock signal DCM_clock.

Into the DCM mode, as shown at time T1, the high side MOS transistor 1022 turns on first, the feedback voltage VFB begins to increase, and the voltage Va is positive. After the on-duty of the drive signal UV, the high side MOS transistor 1022 turns off, and the low side MOS transistor 1024 turns on. During the low side MOS transistor 1024 is conductive, the feedback voltage VFB decreases, and the voltage Va suddenly drops to be negative first and then begins to increase. When the voltage Va is greater than zero, as shown at time T2, the DCM stop signal DCM_stop generated by the CCM/DCM sense circuit 114 changes to low level, having the drive signals UV and LV to be low level, as shown between time T2 and T3, and accordingly, the high side and low side MOS transistors 1022 and 1024 both turn off. Until the feedback voltage VFB is lower than the reference voltage V2 again, as shown at time T3, will the high side MOS transistor 1022 turn on again. Such operations repeat under light load.

When the load changes from light to heavy, as shown at time T4, if under the conductive period of the low side MOS transistor 1026, the voltage Va is lower than zero, and the feedback voltage VFB is also lower than the reference voltage V2, as shown at time T5, the DCM stop signal DCM_stop generated by the CCM/DCM sense circuit 114 is at low level, and the CCM mode switch signal CCM is at high level, switching the converter 100 to the CCM mode.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A controller in a voltage mode buck converter for implementing a mode switch function and an over-current protection by a multifunction pin, the controller comprising:
   a driver responsive to a first control signal for generating a first drive signal and a second drive signal for switching a high side switch and a low side switch connected in series by a phase node to generate an output voltage;
   a CCM/DCM control circuit for generating the first control signal;
   a multiplexer for generating a second control signal and a third control signal from the second drive signal;
   an over-current sense circuit controlled by the second control signal for sensing a voltage on the multifunction pin to thereby generate an over-current signal for signaling the CCM/DCM control circuit; and
   a CCM/DCM sense circuit controlled by the third control signal for sensing the voltage on the multifunction pin and the output voltage to thereby generate a CCM mode switch signal for the CCM/DCM control circuit to switch the converter between a CCM mode and a DCM mode;
   wherein the multifunction pin and phase node has a phase resistor connected therebetween for generating a voltage drop between the multifunction pin and phase node when a current flowing therethrough.

2. The controller of claim 1, wherein the over-current sense circuit comprises:
   a current source for supplying the current;

a switch connected between the current source and multifunction pin and switched by the second control signal to conduct the current to the multifunction pin; and a comparator for comparing the voltage on the multifunction pin with a reference voltage to thereby generate the over-current signal.

3. The controller of claim 1, wherein the CCM/DCM sense circuit comprises:

a first comparator for comparing the voltage on the multifunction pin with a first reference voltage to thereby generate a first comparison signal;

a switch connected between the multifunction pin and first comparator and switched by the third control signal for coupling the voltage on the multifunction pin to the first comparator;

a second comparator for comparing a feedback signal derived from the output voltage with a second reference voltage to thereby generate a second comparison signal; and a logic unit responsive to the first and second comparison signals for generating the CCM mode switch signal.

4. The controller of claim 1, further comprising a maximum duty clamp circuit coupled to the CCM/DCM control circuit for clamping a duty of the high side switch.

5. The controller of claim 1, wherein the driver is supplied with a power input voltage and a boot voltage for booting the high side switch up.

6. The controller of claim 5, further comprising a voltage regulator for converting the power input voltage to the boot voltage.

7. A method for implementing a mode switch function and an over-current protection by a multifunction pin for a voltage mode buck converter having a controller to generate a first drive signal and a second drive signal for switching a high side switch and a low side switch connected in series by a phase node to generate an output voltage, the method comprising the steps of:

connecting a phase resistor between the multifunction pin and phase node for a voltage drop to be generated between the multifunction pin and phase node when a current flowing through the phase resistor;

generating a first control signal for the driver to generate the first and second drive signals;

generating a second control signal and a third control signal from the second drive signal;

sensing a voltage on the multifunction pin in response to the second control signal for generating an over-current signal to determine the first control signal; and sensing the voltage on the multifunction pin and the output voltage in response to the third control signal for generating a CCM mode switch signal to switch the converter between a CCM mode and a DCM mode.

8. The method of claim 7, wherein the step of generating an over-current signal comprises comparing the voltage on the multifunction pin with a reference voltage.

9. The method of claim 7, wherein the step of generating a CCM mode switch signal comprises the steps of:

comparing the voltage on the multifunction pin with a first reference voltage in response to the third control signal for generating a first comparison signal;

comparing a feedback signal derived from the output voltage with a second reference voltage for generating a second comparison signal; and generating the CCM mode switch signal in response to the first and second comparison signals.

10. The method of claim 7, further comprising clamping a duty of the high side switch.

11. The method of claim 7, further comprising booting the high side switch up by a boot voltage.

12. The method of claim 11, further comprising converting a power input voltage to the boot voltage.

* * * * *